(12) United States Patent
Penrod et al.

(10) Patent No.: US 7,240,392 B2
(45) Date of Patent: Jul. 10, 2007

(54) PARK SAFE MECHANISM FOR WIPER SYSTEMS

(75) Inventors: James P. Penrod, Ft. Thomas, KY (US); Harry C. Buchanan, Jr., Dayton, OH (US); Bruce A. Bryson, Arcanum, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 467 days.

(21) Appl. No.: 10/352,413

(22) Filed: Jan. 28, 2003

(65) Prior Publication Data

US 2004/0143925 A1   Jul. 29, 2004

(51) Int. Cl.
*B60S 1/24* (2006.01)
*B60S 1/18* (2006.01)

(52) U.S. Cl. ............... 15/250.13; 15/250.3; 15/250.31; 15/250.27; 74/42; 74/599; 74/600

(58) Field of Classification Search ............... 15/250.3, 15/250.31, 250.27, 250.001, 250.19, 250.16; 74/599, 600, 601, 584, 42, 43
See application file for complete search history.

(56) References Cited

U.S. PATENT DOCUMENTS

| | | | | |
|---|---|---|---|---|
| 2,827,791 A | * | 3/1958 | Kruger | 74/44 |
| 3,688,333 A | * | 9/1972 | Cimino et al. | 15/250.16 |
| 4,009,502 A | * | 3/1977 | Tamaki et al. | 15/250.27 |
| 4,264,997 A | * | 5/1981 | Kolb et al. | 15/250.29 |
| 4,765,018 A | * | 8/1988 | Buchanan, Jr. | 15/250.13 |
| 4,947,507 A | * | 8/1990 | Naiki | 15/250.16 |
| 5,050,442 A | * | 9/1991 | Reed | 74/42 |
| 5,465,636 A | * | 11/1995 | Jones et al. | 74/602 |
| 5,548,863 A | * | 8/1996 | Deng | 15/250.16 |
| 6,000,092 A | * | 12/1999 | Irikura | 15/250.13 |
| 6,148,470 A | | 11/2000 | Buchanan | |
| 2002/0190451 A1 | * | 12/2002 | Sancaktar et al. | 267/166 |

FOREIGN PATENT DOCUMENTS

JP   5-92750   *   4/1993

* cited by examiner

*Primary Examiner*—Gary K. Graham
(74) *Attorney, Agent, or Firm*—Young Basile

(57) ABSTRACT

A windshield wiper drive linkage is provided for use in a wiper system. The linkage includes a crank arm connectible to an output shaft of a drive motor. A drive arm is pivotally connected to the crank arm for movement between first and second angular positions about a pivot pin with respect to one another. A flexible composite spring extends between the crank arm and the drive arm. The flexible composite spring is preloaded into an initial arcuate position and is bendable from the initial position to facilitate preventing damage to components in the wiper system when a load applied to the arms exceeds a predetermined load.

20 Claims, 2 Drawing Sheets

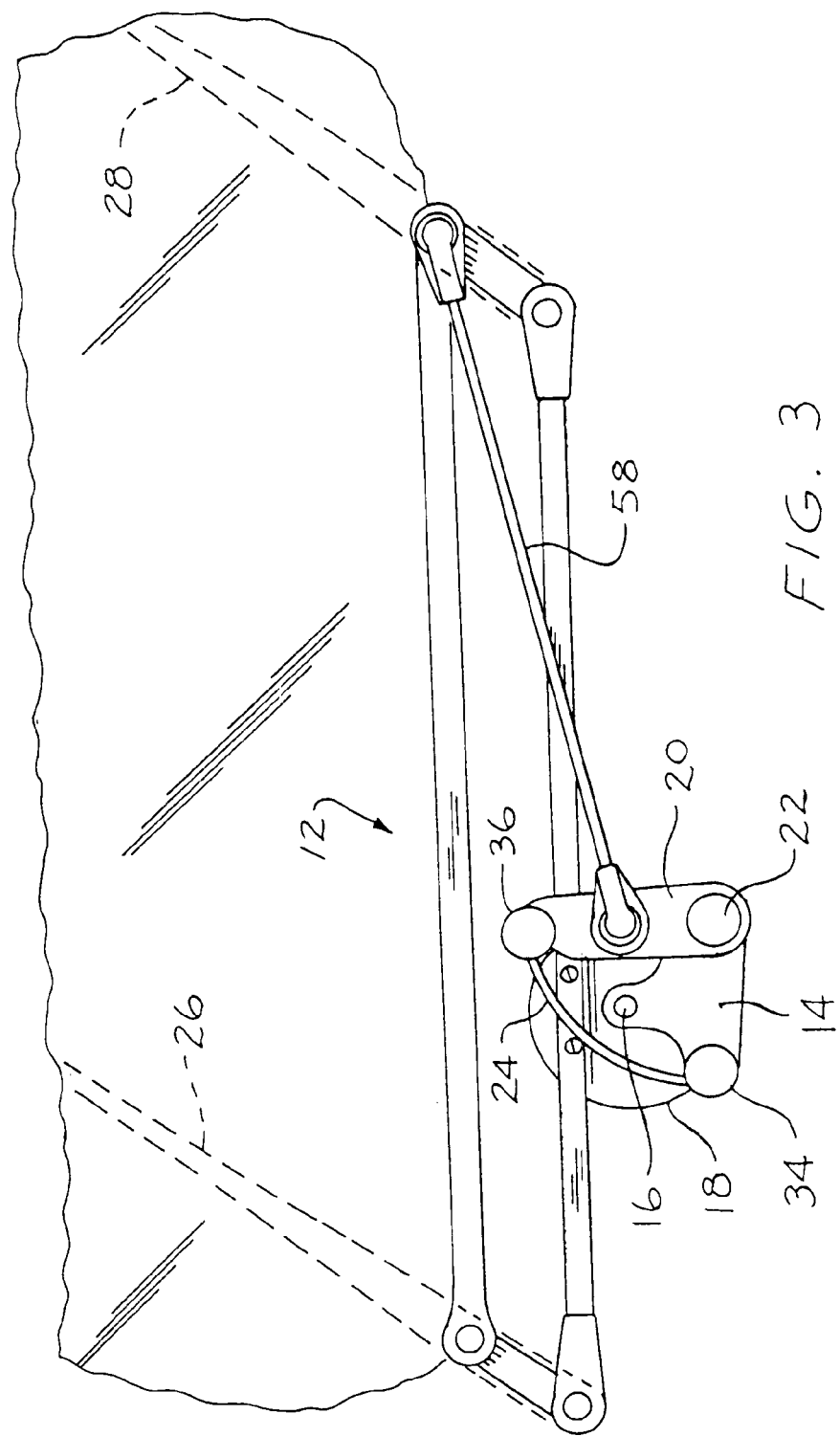

PARK SAFE MECHANISM FOR WIPER SYSTEMS

FIELD OF THE INVENTION

The present invention relates to a windshield wiper system and, more particular, to a windshield wiper system using at least one flexible member capable of bending or flexing to compensate for loads in excess of a predetermined load.

BACKGROUND OF THE INVENTION

In the field of windshield wiper systems, wiper arms having wiper blades thereon are driven from a park position, where the blades are often situated at either the bottom of or below a windshield of a vehicle, through an inwipe position, to an outwipe position during normal wiping operations, the blades oscillate between the inwipe and outwipe positions to clean the windshield of debris or particles, such as ice, snow or other debris. It is not uncommon that snow or ice can accumulate on the windshield and prevent the wiper blades from, for example, fully retracting from the inwipe position to the park position when a user actuates a wiper switch to an off position.

When the debris blocks the wiper arms and blades, a considerable amount of stress is imparted on the wiper linkage and drive motor which drives the blades. For example, a motor drive link, which couples the drive shaft of the motor to the drive linkage which drives the wiper arms, often experiences a compressive force. The linkage members of the wiper systems have in the past been stiffened to reduce expansion and shrinkage in order to avoid changing the wipe pattern requirements for the vehicles. However, in freezing, snowy weather, the snow and ice packs at the bottom of the windshield cause a restriction in the movement in the wiper arm and blade. Because of the rigidity of the motor drive link, the housing which houses the drive gears of the drive motor may crack or break. One or more drive plates which directly or indirectly couple the drive link to other linkages may also crack or break.

It would be desirable to provide a simple, yet effective linkage system which uses one or more spring members to facilitate avoiding the potential for damage to the windshield wiper system as a result of loads in excess of a predetermined load.

SUMMARY OF THE INVENTION

The present invention limits the loads resulting from restricting the normal wipe pattern of a windshield wiper system. Restrictions most commonly occur due to snow and/or ice packing over the cowl screen. Restriction can also occur due to blades being frozen to the windshield glass. Potentially, this condition could occur at any possible wipe position. Similarly, the present invention can also limit the loads arising from restrictions encountered when an operator actuates the park system to either move the wiper blades to the park position or to attempt to move the wiper blades out of the park position. The potential benefits of the present invention include a reduction in warranty claims for damage to the windshield wiper system since the peak loading of the system is attenuated, cost savings since lower peak loads allow using less materials and/or more inexpensive materials, weight reductions from using less materials, and/or improvement in the wipe pattern control since the system can be made stiffer without the burden of having to manage higher loads. Although peak loads increase with stiffness in a wiper system, the present invention limits the peak loads thereby permitting improvement in the wipe pattern control by making the system stiffer. These types of systems are sometimes referred to as snow clutch designs.

The present invention protects all tandem or center drive wiper systems at both the inwipe and outwipe positions. By comparison to a known composite link system, the composite link system only works when a restriction is encountered when the composite link is in compression. This means that for a typical tandem wiper system, no protection is afforded to the situation where a restriction is encountered at the outwipe position with the known composite link configuration. Likewise, for a center drive wiper system, only one of the driving links would be protected by the known composite link system. The known composite link system can only replace a straight link. The function of the known composite link is predicated on column buckling necessitating the use of a straight member. Additionally, the pultruded material, also essential to the function of the known composite link, is produced exclusively as a straight member. The present invention does not preclude application to wiper systems where bent links are required. The known composite link requires significant clearance with respect to the vehicle and the remainder of the wiper system, making packaging of the system difficult. For example, in one wiper system the known composite link may need to axially compress about 8 mm in order to adequately limit the system loading. The axial compression of 8 mm correlates to a lateral deflection of about 30 mm. In comparison, the present invention will be easier to package. The known composite link requires grooves in the pultrusion in order to provide a mechanical lock for the insert molded sockets. The present invention requires only a cut-to-length pultrusion enhancing the durability of the composite material. A typical known composite link configuration is disclosed in U.S. Pat. No. 6,148,470, which is incorporated by reference herein in its entirety.

The present invention is implemented at the crank arm, and one unit of the present invention satisfies the requirements of tandem and center drive systems. By comparison, over-center spring preloaded devices are not an automatic device, as opposed to the known composite link and the park safe mechanism according to the present invention which are automatic devices. Encountering a restriction in the wipe pattern will not trigger a known over-center spring preloaded device. The intent of the known over-center spring preloaded device is to avoid a restriction by the operator manually toggling the device to a winter setting. The winter setting raises the inwipe position of the wipe pattern making encountering a snow/ice pack restriction near the cowl screen less likely. However, given enough cumulation, the winter setting would eventually encounter a restriction and would fail to offer any overload protection. Over-center spring preloaded-devices are implemented at the drive plate of a tandem system. A center drive system would require two of the over-center spring preloaded devices.

The present invention operates on the basis that when a restriction is encountered, the load in the drive link increases. If enough restriction exists, the load will be sufficiently high that the preload of the composite spring will be overcome. At this time, the drive arm/link ball/drive pin assembly will rotate such that the crank radius will be decreased and the motor can continue to rotate. Because the axial force/deflection characteristics of a buckled composite spring member is very nearly perfectly plastic (i.e. an incremental increase in deflection does not require an increase in load), the loads in the system do not increase as this occurs. Once past the restriction, the composite spring will elongate back to its assembled configuration. The ends of the composite spring are captured in slots of the spring connector. As assembled, the composite spring is in a buckled or bent condition. The spring connector nests in hooks provided in the crank arm and the drive arm. The spring connector is free to rotate in the crank plane relative to the crank arm or the drive arm. Flanges on the spring connector prevent it from moving axially relative to the crank arm or the drive arm. The crank arm bolts to the motor output shaft. The drive arm is connected to the crank arm by the pivot pin, the retaining ring and the thrust washer. The drive arm is free to rotate relative to the crank arm after being assembled. The link ball is radial riveted to the drive arm. The drive link assembles to the link ball. A double link ball would be used for center drive applications. The drive pin is press fit into the drive arm. After assembly, the drive pin rides in a slot provided in the crank arm. The slot and pin limit the possible rotational travel of the drive arm relative to the crank arm. This prevents over stressing the composite spring and provides a stop which allows the composite spring to be preloaded as assembled.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a general schematic view of a windshield wiper system including the windshield wiper drive linkage according to the present invention.

DESCRIPTION OF THE PREFERRED EMBODIMENT

Figure 1:
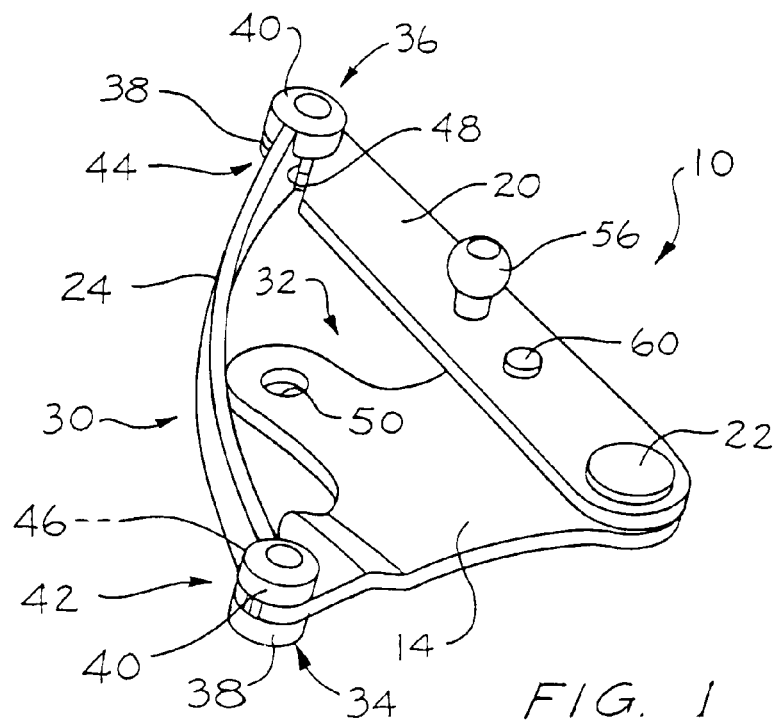
FIG. 1 is a perspective view of a windshield wiper drive linkage according to the present invention.
Figure 2:
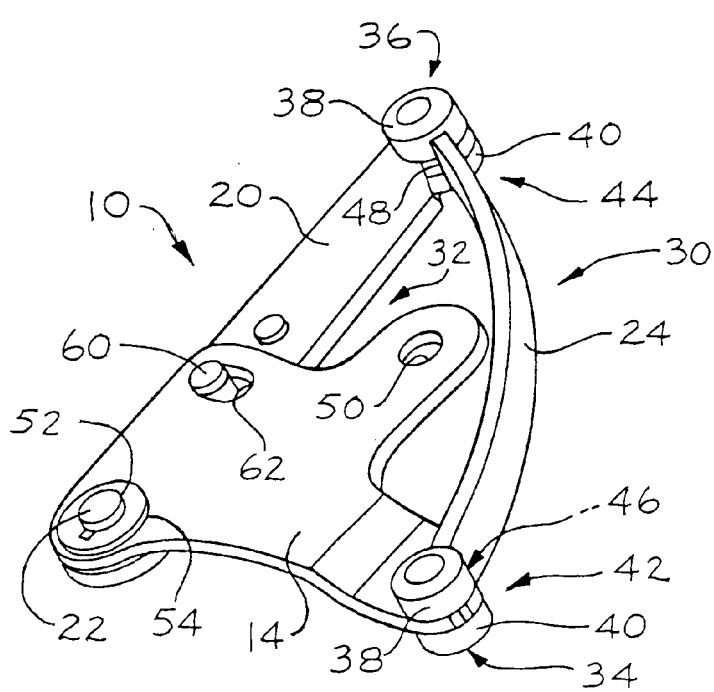
FIG. 2 is a perspective view of the opposite side of the windshield wiper drive linkage according to the present invention illustrated in FIG. 1.

Referring to FIGS. 1–3, a windshield wiper drive linkage 10 according to the present invention is disclosed for use in a wiper system 12 (best seen in FIG. 3). The windshield wiper drive linkage 10 includes a crank arm 14 connectible to an output shaft 16 of a drive motor 18. A drive arm 20 is pivotally connected to the crank arm 14 for movement between first and second angular positions about a pivot the crank arm 14 and the drive arm 20. The flexible composite spring 24 is preloaded into an initial arcuate position (best seen in FIGS. 1 and 2) and is bendable from the initial position to facilitate preventing damage to components in the wiper system 12 when a load applied to the arms 14, 20 exceeds a predetermined load.

Referring now to FIG. 3, the windshield wiper system 12 according to the present invention is adapted for use on a motor vehicle. The system 12 includes a first wiper 26 and a second wiper 28. The drive motor 18 is provided for moving the first and second wipers 26, 28 between an inwipe position, an outwipe position, and a parked position. Means 30 is provided for automatically shortening an effective length of a crank mechanism 32 in response to a load applied to the crank mechanism 32 exceeding a predetermined load to allow continued rotation of the output shaft 16 of the drive motor 18. The shortening means 30 is connectible between the first and second wipers 26, 28 and the drive motor 18. The automatic shortening means 30 includes the windshield wiper drive linkage 10 according to the present invention for use in the wiper system 12. The windshield wiper drive linkage 10 is coupled between the first and second wipers 26, 28 and the drive motor 18. The windshield wiper drive linkage includes the crank arm 14 connectible to the output shaft 16 of the drive motor 18. The drive arm 20 is pivotally connected to the crank arm 14 for movement between first and second angular positions about the pivot pin 22 with respect to one another. The flexible composite spring 24 is preloaded into an initial arcuate position and is bendable from the initial position to facilitate preventing damage to components in the wiper system 12 when a load applied to the arms 14, 20 exceeds a predetermined load. The crank arm 14 and the drive arm 20 define the first angular position when the load is less than the predetermined load, and define the second angular position when the load exceeds the predetermined load. The second angular position is less than the first angular position, thereby effectively shortening a length of the crank mechanism 32 allowing continued rotation of the output shaft 16 of the drive motor 18.

Referring again to FIGS. 1 and 2, a connector 34, 36 is connected at each end of the flexible composite spring 24. Each connector 34, 36 is freely rotatable in a crank arm plane relative to the arms 14, 20. Each connector 34, 36 includes flanges 38, 40 preventing axial movement of each connector 34, 36 relative to the corresponding arm 14, 20. By way of example and not limitation, the flexible composite spring 24 is illustrated in FIGS. 1 and 2 having a rectangular cross-section. The flexible composite spring 24 includes a first end 42 coupled to the crank arm 14 and a second end 44 coupled to the drive arm 20. The first and second ends 42, 44 define a first distance when the load is less than the predetermined load and define a second distance when the load exceeds the predetermined load. The second distance is less than the first distance.

By way of example and limitation, the flexible composite spring 24 can be selected from a group of materials consisting of a fiber-reinforced composite, a thermal set material, a pultruded composite including glass fibers, and combinations thereof. In the preferred configuration, the flexible composite spring has a modulus of elasticity in a range of at least 50,000 lbs per square inch (psi). By way of example and not limitation, the predetermined load can be approximately 30% greater than a maximum working load for the wiper system 12. Also by way of example and not limitation, the predetermined load can be approximately 300 Newton. The load condition can result from a snow/ice build up when the wiper blades are being driven between any of the inwipe position, the outwipe position, and the park position.

The first and second ends 42, 44 of the composite spring 24 are captured in slots 46, 48 formed in the connectors 34, 36. In the assembled condition, the composite spring 24 is buckled or bent into an arcuate form as illustrated in FIGS. 1 and 2. Each connector 34, 36 nests within a hook-like aperture provided in the crank arm 14 and drive arm 20. Each connector 34, 36 is free to rotate in the crank plane relative to the crank arm 14 or drive arm 20. Flanges 38, 40 are provided on each connector 34, 36 to prevent the connector 34, 36 from moving axially relative to the crank arm 14 or drive arm 20, respectively. The crank arm 14 bolts to the motor output shaft 16 of the drive motor 18 through aperture 50. The drive arm 20 is connected to the crank arm 14 by pivot pin 22, retaining ring 52, and thrust washer 54. The drive arm 20 is free to rotate relative to the crank arm 14 after being assembled. At least one link ball 56 is radial riveted to the drive arm 20. The drive link 58 is assembled to the link ball 56. A double link ball configuration (not shown) can be used for center drive applications. A drive pin 60 is press fit into the drive arm 20. After assembly, the drive pin 60 moves within a slot 62 provided in the crank arm 14. The slot 62 and pin 60 limit the possible rotational travel of the drive arm 20 relative to the crank arm 14. This prevents over stressing of the composite spring 24 and provides a stop, which allows the composite spring 24 to be preloaded as assembled.

The windshield wiper drive linkage 10 according to the present invention operates on the basis that when a restriction is encountered, the load in the drive link 58 increases. If enough restriction exists, the loads will be sufficiently high that the preload of the composite spring 24 will be overcome. At that time, the drive arm 20/link ball 56/drive pin 60 assembly will rotate, such that the distance between the center line of the motor output shaft 16 and the center line of the link ball 56 will be reduced. In effect, the crank radius will have decreased and the motor 18 can continue rotating. Since the axial force/deflection characteristic of a buckled composite spring 24 is very nearly perfectly plastic (i.e. an incremental increase in deflection does not require an increase in load), the loads in the wiper system 12 do not increase as the crank radius decreases. Once past the restriction, the composite spring 24 will automatically elongate back to the initial assembled configuration.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A windshield wiper drive linkage for use in a wiper system comprising:
   a crank arm connectible to an output shaft of a drive motor;
   a drive arm pivotably connected to the crank arm for movement between first and second angular positions with respect to one another; and
   a flexible composite rectangular plate spring to be subjected to bending load while extending between the crank arm and the drive arm, the flexible composite spring preloaded into an initial arcuate position and bendable from the initial position to facilitate preventing damage to components in the wiper system when a load applied to the arms exceeds a predetermined load.

2. The windshield wiper drive linkage of claim 1 further comprising:
   a connector at each end of the flexible composite spring, each connector freely rotatable in a crank arm plane relative to the arms and having flanges preventing axial movement relative to the arms.

3. The windshield wiper drive linkage of claim 1, wherein the flexible composite spring is rectangular in cross section.

4. The windshield wiper drive linkage of claim 1, wherein the flexible composite spring has a first end coupled to the crank arm and a second end coupled to the drive arm, the first end and the second end defining a first distance when the load is less than the predetermined load and defining a second distance when the load exceeds the predetermined load, wherein the second distance is less than the first distance.

5. The windshield wiper drive linkage of claim 1, wherein the flexible composite spring has a first end coupled to the crank arm and a second end coupled to the drive arm, the crank arm and the drive arm defining the first angular position when the load is less than the predetermined load and defining the second angular position when the load exceeds the predetermined load, wherein the second angular position is less than the first angular position, thereby effectively shortening a length of the crank arm allowing continued rotation of the output shaft of the drive motor.

6. The windshield wiper drive linkage of claim 1, wherein the flexible composite spring is selected from a group of materials consisting of a fiber-reinforced composite, a thermoset material, a pultruded composite including glass fibers, and combinations thereof.

7. The windshield wiper drive linkage of claim 1, wherein the flexible composite spring has a modulus of elasticity in a range of at least 50,000 psi.

8. The windshield wiper drive linkage of claim 1, wherein the predetermined load is approximately 30 percent greater than a maximum working load.

9. The windshield wiper drive linkage of claim 1, wherein the predetermined load is approximately 300 Newton.

10. The windshield wiper drive linkage of claim 1, wherein the load condition results from a snow build-up when the wiper blades are being driven between any of an inwipe position, an outwipe position, and a park position.

11. A wiper system comprising:
    a first wiper and a second wiper;
    a drive motor for moving the first and second wipers between an inwipe position, an outwipe position, and a park position; and
    a windshield wiper drive linkage coupled between the first and second wipers and the drive motor, the windshield wiper drive linkage including a crank arm connectible to an output shaft of the drive motor, a drive arm pivotably connected to the crank arm for movement between first and second angular positions with respect to one another, and a flexible composite rectangular plate spring to be subjected to bending load while extending between the crank arm and the drive arm, the flexible composite spring preloaded into an initial arcuate position and bendable from the initial position to facilitate preventing damage to components in the wiper system when a load applied to the arms exceeds a predetermined load.

12. The wiper system of claim 11 further comprising:
    a connector at each end of the flexible composite spring, each connector freely rotatable in a crank arm plane relative to the arms and having flanges preventing axial movement relative to the arms.

13. The wiper system of claim 11 wherein the flexible composite spring is rectangular in cross section.

14. The wiper system of claim 11, wherein the flexible composite spring has a first end coupled to the crank arm and a second end coupled to the drive arm, the first end and the second end defining a first distance when the load is less than the predetermined load and defining a second distance when the load exceeds the predetermined load, wherein the second distance is less than the first distance.

15. The wiper system of claim 11, wherein the flexible composite spring has a first end coupled to the crank arm and a second end coupled to the drive arm, the crank arm and the drive arm defining the first angular position when the load is less than the predetermined load and defining the second angular position when the load exceeds the predetermined load, wherein the second angular position is less than the first angular position, thereby effectively shortening a length of the crank arm allowing continued rotation of the output shaft of the drive motor.

16. The wiper system of claim 11, wherein the flexible composite spring is selected from a group of materials consisting of a fiber-reinforced composite, a thermoset material, a pultruded composite including glass fibers, and combinations thereof.

17. The wiper system of claim 11, wherein the predetermined load is approximately 30 percent greater than a maximum working load.

18. The wiper system of claim 11, wherein the load condition results from a snow build-up when the wiper blades are being driven between any of the inwipe position, the outwipe position, and the park position.

19. A windshield wiper system for a motor vehicle comprising:
- a first wiper and a second wiper;
- a drive motor for moving the first and second wipers between an inwipe position, an outwipe position, and a parked position; and
- means for automatically shortening an effective length of a crank in response to a load applied to the crank exceeding a predetermined load to allow continued rotation of an output shaft of the drive motor, the shortening means connectible between the first and second wipers and the drive motor, wherein the shortening means includes a flexible composite rectangular plate spring to be subjected to bending load while preloaded to an arcuate position and extending between the crank and a pivotally connected drive arm.

20. A windshield wiper system for a motor vehicle comprising:
- a first wiper and a second wiper;
- a drive motor for moving the first and second wipers between an inwipe position, an outwipe position, and a parked position;
- means for automatically shortening an effective length of a crank in response to a load applied to the crank exceeding a predetermined load to allow continued rotation of an output shaft of the drive motor, the shortening means connectible between the first and second wipers and the drive motor; and
- a windshield wiper drive linkage coupled between the first and second wipers and the drive motor, the windshield wiper drive linkage including a crank arm connectible to an output shaft of the drive motor, a drive arm pivotably connected to the crank arm for movement between first and second angular positions with respect to one another, and a flexible composite rectangular plate spring to be subject to bending load while extending between the crank arm and the drive arm, the flexible composite spring preloaded into an initial arcuate position and bendable from the initial position to facilitate preventing damage to components in the wiper system when a load applied to the arms exceeds a predetermined load, the crank arm and the drive arm defining the first angular position when the load is less than the predetermined load and defining the second angular position when the load exceeds the predetermined load, wherein the second angular position is less than the first angular position, thereby effectively shortening a length of the crank allowing continued rotation of the output shaft of the drive motor.

* * * * *

UNITED STATES PATENT AND TRADEMARK OFFICE
CERTIFICATE OF CORRECTION

PATENT NO. : 7,240,392 B2  Page 1 of 1
APPLICATION NO. : 10/352413
DATED : July 10, 2007
INVENTOR(S) : James P. Penrod et al.

It is certified that error appears in the above-identified patent and that said Letters Patent is hereby corrected as shown below:

Page 1, Column 2, Line 10; After "Buchanan" insert --B60S/1/24 --.
Column 2, Line 53; Delete "preloaded-devices" an insert --preloaded devices--, therefor.
Column 3, Line 20; After "stop" insert --,--.
Column 3, Line 34; Delete "invention," and insert --invention;--, therefor.
Column 3, Line 51; After "pivot" insert --pin 22 with respect to one another. A flexible composite spring 24 extends between--.
Column 6, Line 55; In Claim 13, after "11" insert --,--.
Column 8, Line 20; In Claim 20, delete "subject" and insert --subjected--, therefor.

Signed and Sealed this

Sixth Day of November, 2007

JON W. DUDAS
*Director of the United States Patent and Trademark Office*